United States Patent
Arcella et al.

[11] Patent Number: 5,612,419
[45] Date of Patent: Mar. 18, 1997

[54] FLUORINATED THERMOPLASTIC ELASTOMERS HAVING SUPERIOR MECHANICAL AND ELASTIC PROPERTIES, AND THE PREPARATION PROCESS THEREOF

[75] Inventors: Vincenzo Arcella, Novara; Giulio Brinati, Milan; Margherita Albano, Milan; Vito Tortelli, Milan, all of Italy

[73] Assignee: Ausimont S.p.A., Milan, Italy

[21] Appl. No.: 361,660

[22] Filed: Dec. 22, 1994

[30] Foreign Application Priority Data

Dec. 29, 1993 [IT] Italy .................. MI93A2749

[51] Int. Cl.$^6$ .................. C08F 259/08
[52] U.S. Cl. .................. 525/252
[58] Field of Search .................. 525/252

[56] References Cited

U.S. PATENT DOCUMENTS

| | | |
|---|---|---|
| 2,515,628 | 7/1950 | Castle . |
| 2,520,388 | 8/1950 | Earl . |
| 3,068,187 | 12/1962 | Bolstad et al. .................. 260/29.6 |
| 3,252,932 | 5/1966 | Bolstad et al. .................. 260/29.4 |
| 3,810,874 | 5/1974 | Mitsch . |
| 3,865,845 | 2/1975 | Resnick . |
| 3,887,373 | 6/1975 | Hays et al. . |
| 3,978,030 | 8/1976 | Resnick . |
| 4,158,678 | 6/1979 | Tatemoto et al. . |
| 4,472,557 | 9/1984 | Kawashima et al. .................. 525/276 |
| 4,500,739 | 2/1985 | Caporiccio et al. . |
| 4,748,223 | 5/1988 | Haruyoshi et al. . |
| 4,789,717 | 2/1988 | Giannetti et al. . |
| 4,864,006 | 9/1989 | Giannetti et al. . |
| 4,935,467 | 6/1990 | Cheng et al. . |
| 5,061,606 | 10/1991 | Telser et al. . |
| 5,173,553 | 12/1992 | Albano et al. . |

FOREIGN PATENT DOCUMENTS

| | | |
|---|---|---|
| 0073087 | 3/1983 | European Pat. Off. . |
| 0076581 | 4/1983 | European Pat. Off. . |
| 0080187 | 6/1983 | European Pat. Off. . |
| 0444700 | 9/1991 | European Pat. Off. . |

*Primary Examiner*—Joseph L. Schofer
*Assistant Examiner*—N. Sarofim
*Attorney, Agent, or Firm*—Watson Cole Stevens Davis, P.L.L.C.

[57] ABSTRACT

Fluorinated thermoplastic elastomers comprising monomeric units deriving from a bis-olefin having general formula:

$$R_1R_2C=C-Z-C=CR_5R_6 \qquad (I)$$
$$\phantom{R_1R_2C=C}|\phantom{-Z-}|$$
$$\phantom{R_1R_2C=C}R_3\phantom{-Z-}R_4$$

wherein:

$R_1, R_2, R_3, R_4, R_5, R_6$, equal or different from each other, are H or alkyls $C_1$–$C_5$; Z is an alkylene or cycloalkylene radical $C_1$–$C_{18}$, linear or branched, optionally containing oxygen atoms, preferably at least partially fluorinated, or a (per)fluoropolyoxyalkylene radical.

8 Claims, No Drawings

FLUORINATED THERMOPLASTIC ELASTOMERS HAVING SUPERIOR MECHANICAL AND ELASTIC PROPERTIES, AND THE PREPARATION PROCESS THEREOF

The present invention relates to new fluorinated thermoplastic elastomers having superior mechanical and elastic properties and to the preparation process thereof.

As known, thermoplastic elastomers are block copolymers consisting of at least a "soft" segment having elastomeric properties and of at least a "hard" segment having plastomeric properties. Therefore, such products combine the typical properties of conventional crosslinked elastomers with those typical of plastomers. With respect to the traditional elastomers, they do not require any vulcanization process, hence they are easily processable and recyclable according to the techniques usually employed for thermoplastic polymers, with apparent both economical and ecological advantages.

Fluorinated thermoplastic elastomers are known in the art. For instance, in U.S. Pat. No. 4,158,678, which is herein incorporated by reference, fluorinated block polymers, constituted by alternated hard and soft segments, at least one being fluorinated, are described. Such products are obtained by radical polymerization of fluorinated monomers in the presence of an iodinated chain transfer agent of formula $RI_n$, wherein R is a fluorinated radical, optionally containing chlorine, having from 1 to 8 carbon atoms, and n is 1 or 2, thus obtaining a first fluorinated polymer segment, with elastomeric or plastomeric characteristics depending on the monomeric composition, having an iodine atom on one or both of the end-groups. On such segment other fluorinated or non-fluorinated segments of different kind are then grafted, taking advantage of the fact that the terminal iodine atoms are reactive towards radicals and thus can cause the growth of a new polymer chain. Therefore, it is thus possible to obtain, for instance, fluorinated thermoplastic elastomers of A-B-A type, where A is a plastomeric segment (for instance an homopolymer or copolymer deriving from tetrafluoroethylene and/or vinylidene fluoride), while B is an elastomeric segment (for instance a copolymer tetrafluoroethylene/vinylidene fluoride/hexafluoropropene). Other thermoplastic elastomers of this type are described in EP-444,700.

A shortcoming of such products is that the mechanical and elastic properties quickly get worse when the temperature rises, and are quite unsatisfactory even at 50° C. In particular the compression set values are so high to render the products unsuitable for manufacturing sealing elements (for instance shaft seals) to be used at high temperatures, as required by automotive, aerospace, plant engineering industry.

The Applicant has now surprisingly found that it is possible to obtain new fluorinated thermoplastic elastomers endowed with superior mechanical and elastic properties by introducing into the polymer chain small amounts of a bis-olefin, whose structure is defined hereinunder. The obtained products are especially characterized by particularly low compression set values in comparison with the fluorinated thermoplastic elastomers known in the art, having also superior mechanical properties, in particular as regards tensile strength.

Object of the present invention is therefore a fluorinated thermoplastic elastomer having a block structure consisting of at least a fluorinated polymer segment of type A having elastomeric properties and of at least a fluorinated polymer segment of type B having plastomeric properties, wherein at least one of the segments of type A or B comprises monomeric units deriving from a bis-olefin having general formula:

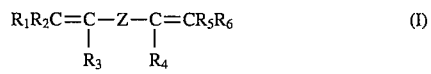

wherein:

$R_1$, $R_2$, $R_3$, $R_4$, $R_5$, $R_6$, equal or different from each other, are H or alkyl $C_1$–$C_5$;

Z is a linear or branched alkylene or cycloalkylene radical $C_1$–$C_{18}$, optionally containing oxygen atoms, preferably at least partially fluorinated, or a (per)fluoropolyoxyalkylene radical. A further object of the present invention is a process for preparing the above defined fluorinated thermoplastic elastomers, which sequentially comprises:

(a) polymerizing at least a fluorinated olefinic monomer, optionally in association with one or more non-fluorinated olefins, in the presence of a radical initiator and of an iodinated chain transfer agent, introducing as comonomer a bis-olefin of formula (I) as defined above, so as to obtain a pre-polymer formed by a polymer segment of type A or B and having one or more iodinated end-groups deriving from the chain transfer agent;

(b) polymerizing at least a fluorinated olefinic monomer, optionally in association with one or more non-fluorinated olefins, in the presence of a radical initiator and of the pre-polymer obtained from step (a), so as to graft on said pre-polymer through the iodinated end-groups at least a polymer segment of type B or A different from that of the pre-polymer.

A block polymer is thus obtained, formed by two different types of segments, which still shows at least an iodinated end-group which can be used in a further polymerization stage, in order to introduce in the structure other polymer segments different or even equal to the preceding, with the proviso that in any case blocks of type A (elastomeric) alternated to blocks of type B (plastomeric) are to be obtained (to this purpose see what described in U.S. Pat. No. 4,158,678).

In the formula (I), Z is preferably a perfluoroalkylene radical $C_4$–$C_{12}$, more preferably a perfluoroalkylene radical $C_4$–$C_8$, while $R_1$, $R_2$, $R_3$, $R_4$, $R_5$, $R_6$ are preferably hydrogen.

When Z is a (per)fluoropolyoxyalkylene radical, it has preferably the formula:

where: Q is an alkylene or oxyalkylene radical $C_1$–$C_{10}$; p is 0 or 1; m and n are numbers such that the ratio m/n is comprised between 0.2 and 5 and the molecular weight of said (per)fluoropolyoxyalkylene radical is of from 500 to 10,000, preferably from 1,000 to 4,000. Preferably, Q is selected from: —$CH_2OCH_2$—; —$CH_2O(CH_2CH_2O)_s$—, s=1–3.

The bis-olefins of formula (I) where B is an alkylene or cycloalkylene radical can be prepared according to what described, for instance, by I. L. Knunyants et al in Izv. Akad. Nauk. SSSR, Ser. Khim., 1964(2), 384–6, while the bis-olefins containing (per)fluoropolyoxyalkylene sequences of formula (II) are described in U.S. Pat. No. 3,810,874.

The amount of units deriving from such bis-olefins in each polymer segment is generally comprised between 0.01 and 1.0%, preferably between 0.03 and 0.5%, even more preferably between 0.05 and 0.2% by mole, calculated with respect to the total amount of the other monomers forming the polymer segment.

With fluorinated olefinic monomers it is meant all of the fluorinated products having at least a double bond C=C, optionally containing hydrogen and/or chlorine and/or bromine and/or iodine and/or oxygen, capable of forming (co)polymers in the presence of radical initiators. Among them we can cite: perfluoroolefins $C_2$-$C_8$, such as tetrafluoroethylene (TFE), hexafluoropropene (HFP), hexafluoroisobutene; hydrogen-containing fluoroolefins $C_2$-$C_8$, such as vinylfluoride (VF), vinylidenefluoride (VDF), trifluoroethylene, perfluoroalkylethylene $CH_2=CH-R_f$, where $R_f$ is a perfluoroalkyl $C_1$-$C_6$; chloro- and/or bromo- and/or iodofluoroolefins $C_2$-$C_8$, such as chlorotrifluoroethylene (CTFE) and bromotrifluoroethylene; (per)fluoroalkylvinylethers (PAVE) $CF_2=CFOR_f$, where $R_f$ is a (per)fluoroalkyl $C_1$-$C_6$, for instance trifluoromethyl, bromodifluoromethyl or pentafluoropropyl; (per)fluoro-oxyalkylvinylethers $CF_2=CFOX$, where X is a (per)fluoro-oxyalkyl $C_1$-$C_{12}$ having one or more ether groups, for instance perfluoro-2-propoxy-propyl; perfluorodioxols.

Such fluorinated olefinic monomers can be also copolymerized with non-fluorinated olefins $C_2$-$C_8$, such as ethylene, propylene, isobutylene.

Particularly, the segments of type A (elastomeric) can be selected from the following classes (composition expressed as % by moles):

(1) VDF-based copolymers, where the latter is copolymerized with at least a comonomer selected from: perfluoroolefins $C_2$-$C_8$; chloro- and/or bromo- and/or iodo-fluoroolefins $C_2$-$C_8$; (per)fluoroalkylvinylethers (PAVE) or (per)fluorooxyalkylvinylethers as defined above; non-fluorinated olefins (Ol) $C_2$-$C_8$; typical compositions are the following: (a) VDF 45–85%, HFP 15–45%, 0–30% TFE; (b) VDF 50–80%, PAVE 5–50%, TFE 0–20%; (c) VDF 20–30%, Ol 10–30%, HFP and/or PAVE 18–27%, TFE 10–30%;

(2) copolymers based on TFE, where the latter is copolymerized with at least a comonomer selected from: (per)fluoroalkylvinylethers (PAVE) or (per)fluorooxyalkylvinylethers as defined above; hydrogen-containing fluoroolefins $C_2$-$C_8$; fluoroolefins $C_2$-$C_8$ containing chlorine and/or bromine and/or iodine atoms; non-fluorinated olefins (Ol) $C_2$-$C_8$; typical compositions are the following: (a) TFE 50–80%, PAVE 20–50%; (b) TFE 45–65% Ol 20–55%, 0–30% VDF; (c) TFE 32–60%, Ol 10–40%, PAVE 20–40%.

The segments of type B (plastomeric) can be selected in particular from the following classes (compositions expressed as % by moles):

(1) polytetrafluoroethylene or modified polytetrafluoroethylene containing small amounts, generally from 0.1 to 3%, preferably lower than 0.5%, of one or more comonomers such as, for instance: HFP, PAVE, VDF, hexafluoroisobutene, CTFE, perfluoroalkylethylenes;

(2) TFE thermoplastic polymers containing from 0.5 to 8% of at least a PAVE, such as, for instance, copolymers from TFE and perfluoropropylvinylether and/or perfluoromethylvinylether, or also TFE/perfluoroalkylethylene copolymers;

(3) TFE thermoplastic polymers containing from 2 to 20% of a perfluoroolefin $C_3$-$C_8$, such as, for instance, FEP (TFE/HFP copolymer), to which other comonomers having vinylether structure $CF_2=CF-OR_f$ or $CF_2=CF-OX$, as defined above, can be added in small amounts (lower than 5%);

(4) TFE or CTFE copolymers (40–60%) with ethylene, propylene or isobutylene (40–60%), optionally containing as third comonomer a (per) fluoroolefin $C_3$-$C_8$ or a PAVE, in amounts comprised from 0.1 to 10%;

(5) polyvinylidenefluoride or modified polyvinylidenefluoride containing small amounts, generally from 0.1 to 10%, of one or more fluorinated comonomers, such as hexafluoropropene, tetrafluoroethylene, trifluoroethylene.

The thermoplastic polymers of the classes indicated above, and in particular the TFE-based polymers, can be modified with perfluorinated dioxols, as for instance described in patents U.S. Pat. No. 3,865,845, U.S. Pat. No. 3,978,030, EP-73,087, EP-76,581, EP-80,187.

The weight ratio between elastomeric segments and plastomeric segments in the thermoplastic elastomers object of the present invention can vary within a wide range, but it is preferably comprised between 50:50 and 95:5, more preferably between 60:40 and 90:10 respectively.

The process for preparing the fluorinated thermoplastic elastomers object of the present invention, is preferably carried out in aqueous emulsion according to methods well known in the art, in the presence of suitable radical initiators. The latter can be selected for instance from: inorganic peroxides (for instance alkali metal or ammonium perphosphates, perborates or percarbonates), optionally in combination with ferrous, cuprous or silver salts or other readily oxidable metals; organic peroxides (for instance, disuccinylperoxide, tertbutyl-hydroperoxide, ditertbutylperoxide); azocompounds (see U.S. Pat. No. 2,515,628 and U.S. Pat. No. 2,520,338). It is also possible to use organic or inorganic redox systems, such as ammonium persulphate/sodium sulphite, hydrogen peroxide/aminoiminomethansulphinic acid.

In the reaction medium usually there are also surfactants of various types, among which particularly preferred are the fluorinated surfactants of formula:

wherein $R_f$ is a (per)fluoroalkyl chain $C_5$-$C_{16}$ or a (per)fluoropolyoxyalkylene chain, $X^-$ is $-COO^-$ or $-SO_3^-$, $M^+$ is selected from: $H^+$, $NH_4^+$, alkali metal ion. Among the most commonly used, we can cite: ammonium perfluorooctanoate, (per)fluoropolyoxyalkylenes terminated with one or more carboxylic groups, etc.

During step (a) of the process, iodinated chain transfer agents of formula $R_fI_n$ are added to the reaction medium, wherein $R_f$ is a (per)fluoroalkyl or a (per)fluorochloroalkyl having from 1 to 16 carbon atoms, preferably from 1 to 8 carbon atoms, whereas n is 1 or 2. It is also possible to use as chain transfer agents iodides and/or bromides of alkali or alkaline-earth metals, as described in U.S. Pat. No. 5,173,553. The amount of chain transfer agent to be added is determined according to the molecular weight meant to be achieved and on the effectiveness of the transfer agent itself.

The amount of bis-olefin to be added to the reaction medium depends on the amount of units deriving therefrom which are desired in the final product, keeping in mind that at the low amounts employed according to the present invention, in practice the whole bis-olefin present in the reaction medium enters the chain.

When the step (a) is concluded, the reaction is discontinued, for instance by cooling, and the residual monomers are removed, for instance by heating the emulsion under vigorous stirring. The second polymerization step is then carried out, feeding the new monomer mixture and adding new radical initiator. If necessary, during this second step, additional chain transfer agent is added, which can be selected from the same iodinated products described above, or from the transfer agents known in the art for fluorinated polymers, such as for instance: ketones, esters or aliphatic alcohols having from 3 to 10 carbon atoms, such as acetone, ethylacetate, diethylmalonate, diethylether, isopropyl alcohol, etc.; hydrocarbons, optionally containing hydrogen, such as chloroform, trichlorofluoromethane, etc.; bis(alkyl)carbonates wherein the alkyl has from 1 to 5 carbon atoms, such as bis(ethyl) carbonate, bis(isobutyl) carbonate, etc.

When processing is concluded, the thermoplastic elastomer is isolated from the emulsion by means of conventional methods, such as coagulation by addition of electrolytes or by cooling.

Alternatively, the polymerization reaction can be carried out in mass or in suspension, in an organic liquid where a suitable radical initiator is present, according to known techniques.

The polymerization temperature and pressure can vary within wide limits depending on the type of monomers used and on the other reaction conditions. It is generally operated at a temperature of from −20° to 150° C., with a pressure up to 10 MPa.

The process for preparing the thermoplastic elastomers object of the present invention is preferably carried out in aqueous emulsion in the presence of an emulsion, dispersion or microemulsion of perfluoropolyoxyalkylenes, as described in U.S. Pat. Nos. 4,789,717 and 4,864,006.

The present invention will be now better illustrated by the following working examples, which have a purpose merely indicative but not limitative of the scope of the invention itself.

EXAMPLE 1

In a 5 l autoclave, equipped with a stirrer working at 630 rpm, there were charged, after evacuation, 3.5 l of demineralized water and 36 ml of a microemulsion, obtained by mixing:

7.8 ml of an acid-terminated perfluoropolyoxyalkylene of formula:

$$CF_3O(CF_2-CF(CF_3)O)_n(CF_2O)_mCF_2COOH$$

where n/m=10, having average molecular weight of 600;

7.8 ml of a 30% by volume $NH_4OH$ aqueous solution;

15.6 ml of demineralized water;

4.8 ml of Galden® D02 of formula:

$$CF_3O(CF_2-CF(CF_3)O)_n(CF_2O)_mCF_3$$

wherein n/m=20, having average molecular weight of 450.

The autoclave was then brought to 80° C. and kept at such temperature for the overall duration of the reaction. The following mixture of monomers was then fed:

| | | |
|---|---|---|
| VDF | 23.5% | by moles |
| HFP | 61.0% | by moles |
| TFE | 15.5% | by moles | so as to bring the pressure to 25 bar.

In the autoclave were then introduced:

112 ml of an ammonium persulphate (APS) aqueous solution having a concentration of 1.0 g/l;

1,4-diiodoperfluorobutane ($C_4F_8I_2$) as chain transfer agent, in the form of a solution obtained by dissolving 2.4 ml of the iodinated product in 17.6 ml of the same Galden® D02 used for the microemulsion;

a bis-olefin of formula $CH_2=CH-(CF_2)_6-CH=CH_2$, in the form of a solution obtained by dissolving 1.2 ml in 48.8 ml of the same Galden® D02 described above; the addition was carried out in 20 portions, each portion of 2.5 ml, beginning from the polymerization start and every 5% increase in the monomer conversion.

The pressure of 25 bar was kept constant for the overall duration of the polymerization by feeding a mixture consisting of:

| | | |
|---|---|---|
| VDF | 50.0% | by moles |
| HFP | 26.0% | by moles |
| TFE | 24.0% | by moles |

After 120 minutes of reaction, the reaction was discontinued by cooling the reactor at room temperature. The so obtained latex was heated to 95° C. for 30 minutes under stirring at 100 rpm. The residual pressure was then discharged and the temperature brought to 80° C. VDF was then fed into the autoclave up to a pressure of 30 bar, and 90 ml of a 0.3 g/l APS solution were then added. The polymerization was carried out for 108 minutes until a conversion of 150 g of VDF was obtained. The autoclave was then cooled, the latex discharged and the polymer coagulated by adding an aluminum sulphate solution (6 g of sulphate per liter of latex). After washing, the so obtained product was dried in oven for 24 hours at 70° C. and then characterized as reported in Table 1. The polymer monomer composition was determined by $^{19}F$-NMR analysis.

EXAMPLE 2 (COMPARATIVE)

Following the same procedure as described in Example 1, a polymer of the same type but devoid of the bis-olefin was prepared. The properties of the product are reported in Table 1.

TABLE 1

| POLYMER CHARACTERISTICS | EX. 1 | | EX. 2(*) | |
|---|---|---|---|---|
| Composition (% mole) | soft/ | hard | soft/ | hard |
| VDF | 55.9 | 100 | 56.4 | 100 |
| HFP | 18.2 | — | 18.5 | — |
| TFE | 25.9 | — | 25.1 | — |
| bis-olefin | 0.11 | — | — | — |
| Soft/hard weight ratio | 80:20 | | 80:20 | |
| $T_g$ (°C.) | −15.1 | | −13.9 | |
| $T_m$ (°C.) | 163.2 | | 160.7 | |
| $\Delta H_m$ (cal/g) | 3.5 | | 3.0 | |
| (ASTM D3418-82 - DSC) | | | | |
| Mechanical properties after press at 180° C. for 5 min (ASTM D412-83) | | | | |
| Modulus at 50% (MPa) | — | | 3.3 | |
| Modulus at 100% (MPa) | 5.1 | | 4.4 | |
| Modulus at 200% (MPa) | 8.2 | | 6.4 | |
| Stress at break (MPa) | 10.4 | | 7.8 | |
| Elongation at break (%) | 452 | | 460 | |
| Shore A Hardness (points) | 85 | | 77 | |
| Compression set (ASTM D395 Method B) | | | | |
| at 120° C. for 24 hrs (%) | 60 | | 73 | |
| at 100° C. for 24 hrs (%) | 58 | | 69 | |

(*)comparative

EXAMPLE 3

In a 10 l autoclave, equipped with a stirrer working at 545 rpm, there were charged, after evacuation, 6.5 l of demineralized water and 66.9 ml of a microemulsion, obtained by mixing:

14.5 ml of an acid-terminated perfluoropolyoxyalkylene of formula:

$$CF_3O(CF_2-CF(CF_3)O)_n(CF_2O)_mCF_2COOH$$

where n/m=10, having average molecular weight of 600;

14.5 ml of a 30% by volume $NH_4OH$ aqueous solution;

29.0 ml of demineralized water;

8.9 ml of Galden® D02 of formula:

$$CF_3O(CF_2-CF(CF_3)O)_n(CF_2O)_mCF_3$$

wherein n/m=20, having average molecular weight of 450.

The autoclave was then brought to 80° C. and kept at such temperature for the overall duration of the reaction. The following mixture of monomers was then fed:

| | |
|---|---|
| VDF | 39.0% by moles |
| MVE | 41.0% by moles |
| TFE | 20.0% by moles |

(MVE=perfluoromethylvinylether), so as to bring the pressure to 25 bar.

In the autoclave were then introduced:

208 ml of an ammonium persulphate (APS) aqueous solution having a concentration of 1.0 g/l;

1,6 -diiodoperfluorohexane ($C_6F_{12}I_2$) as chain transfer agent, in the form of a solution obtained by dissolving 6.8 ml of the iodinated product in 13.2 ml of the same Galden® D02 used for the microemulsion;

a bis-olefin of formula $CH_2=CH-(CF_2)_6-CH=CH_2$, in the form of a solution obtained by dissolving 8.6 ml in 41.4 ml of the same Galden® D02 described above; the addition was carried out in 20 portions, each portion of 2.5 ml, beginning from the polymerization start and every 5% increase in the monomer conversion.

The pressure of 25 bar was kept constant for the overall duration of the polymerization by feeding a mixture consisting of:

| | |
|---|---|
| VDF | 54.0% by moles |
| MVE | 24.0% by moles |
| TFE | 22.0% by moles |

After 99 minutes of reaction, the reaction was discontinued by cooling the reactor at room temperature. The so obtained latex was heated to 95° C. for 30 minutes under stirring at 100 rpm. The residual pressure was then discharged and the temperature brought to 80° C. VDF was then fed into the autoclave up to a pressure of 30 bar, and 100 ml of a 0.5 g/l APS solution were then added. The polymerization was carried out for 197 minutes until a conversion of 560 g of VDF was obtained. The autoclave was then cooled, the latex discharged and the polymer coagulated by adding an aluminum sulphate solution (6 g of sulphate per liter of latex). After washing, the so obtained product was dried in oven for 24 hours at 70° C. and then characterized as reported in Table 2. The polymer monomer composition was determined by $^{19}$F-NMR analysis.

EXAMPLE 4 (COMPARATIVE)

Following the same procedure as described in Example 3, a polymer of the same type but devoid of the bis-olefin was prepared. The properties of the product are reported in Table 2.

TABLE 2

| POLYMER CHARACTERISTICS | EX. 3 | | EX. 4(*) | |
|---|---|---|---|---|
| Composition (% mole) | soft/ | hard | soft/ | hard |
| VDF | 62.1 | 100 | 62.5 | 100 |
| MVE | 19.1 | — | 18.9 | — |
| TFE | 18.8 | — | 18.6 | — |
| bis-olefin | 0.146 | — | — | — |
| Soft/hard weight ratio | 80:20 | | 80:20 | |
| $T_g$ (°C.) | −29.3 | | −30.6 | |
| $T_m$ (°C.) | 161.8 | | 160.2 | |
| $\Delta H_m$ (cal/g) | 2.5 | | 2.5 | |
| (ASTM D3418-82 - DSC) | | | | |

TABLE 2-continued

| POLYMER CHARACTERISTICS | EX. 3 | EX. 4(*) |
|---|---|---|
| Mechanical properties after press at 180° C. for 5 min (ASTM D412-83) | | |
| Modulus at 50% (MPa) | — | — |
| Modulus at 100% (MPa) | 3.2 | 2.3 |
| Modulus at 200% (MPa) | 3.7 | 3.0 |
| Stress at break (MPa) | 9.0 | 3.1 |
| Elongation at break (%) | 384 | 520 |
| Shore A Hardness (points) | 64 | 54 |
| Compression set (ASTM D395 Method B) | | |
| at 120° C. for 24 hrs (%) | 49 | 98 |
| at 100° C. for 24 hrs (%) | 43 | 92 |

(*)comparative

EXAMPLE 5

In a 10 l autoclave, equipped with a stirrer working at 545 rpm, there were charged, after evacuation, 6.5 l of demineralized water and 75.0 ml of a microemulsion, obtained by mixing:

16.25 ml of an acid-terminated perfluoropolyoxyalkylene of formula:

$$CF_3O(CF_2-CF(CF_3)O)_n(CF_2O)_mCF_2COOH$$

where n/m=10, having average molecular weight of 600;

16.25 ml of a 30% by volume $NH_4OH$ aqueous solution;

32.5 ml of demineralized water;

10.0 ml of Galden® D02 of formula:

$$CF_3O(CF_2-CF(CF_3)O)_n(CF_2O)_mCF_3$$

wherein n/m=20, having average molecular weight of 450.

The autoclave was then brought to 80° C. and kept at such temperature for the overall duration of the reaction. The following mixture of monomers was then fed:

| | |
|---|---|
| VDF | 23.0% by moles |
| HFP | 65.0% by moles |
| TFE | 12.0% by moles | so as to bring the pressure to 25 bar.

In the autoclave were then introduced:

208 ml of an ammonium persulphate (APS) aqueous solution having a concentration of 1.0 g/l;

1,6 -diiodoperfluorohexane ($C_6F_{12}I_2$) as chain transfer agent, in the form of a solution obtained by dissolving 6.8 ml of the iodinated product in 13.2 ml of the same Galden® D02 used for the microemulsion;

a bis-olefin of formula $CH_2=CH-(CF_2)_6-CH=CH_2$, in the form of a solution obtained by dissolving 8.6 ml in 41.4 ml of the same Galden® D02 described above; the addition was carried out in 20 portions, each portion of 2.5 ml, beginning from the polymerization start and every 5% increase in the monomer conversion.

The pressure of 25 bar was kept constant for the overall duration of the polymerization by feeding a mixture consisting of:

| | |
|---|---|
| VDF | 50.0% by moles |
| MVE | 26.0% by moles |
| TFE | 24.0% by moles |

After 272 minutes of reaction, the reaction was discontinued by cooling the reactor at room temperature. The so obtained latex was heated to 95° C. for 30 minutes under stirring at 100 rpm. The residual pressure was then discharged and the temperature brought to 80° C. A mixture consisting of 27.0% by mole of ethylene (ET) and 73.0% by mole of TFE was then fed into the autoclave up to a pressure of 20 bar, and 195 ml of a 1.0 g/l APS solution were then added. The working pressure of 20 bar was kept constant during the reaction by feeding a mixture consisting of 49.0% by mole of ET and 51.0% by mole of TFE. The polymerization was carried out for 183 minutes until a conversion of 560 g of the ET/TFE mixture was obtained. The autoclave was then cooled, the latex discharged and the polymer coagulated by adding an aluminum sulphate solution (6 g of sulphate per liter of latex). After washing, the so obtained product was dried in oven for 24 hours at 70° C. and then characterized as reported in Table 3. The polymer monomer composition was determined by $^{19}$F-NMR analysis.

EXAMPLE 6 (COMPARATIVE)

Following the same procedure as described in Example 5, a polymer of the same type but devoid of the bis-olefin was prepared. The properties of the product are reported in Table 3.

TABLE 3

| POLYMER CHARACTERISTICS | EX. 3 | | EX. 4(*) | |
|---|---|---|---|---|
| Composition (% mole) | soft/ | hard | soft/ | hard |
| VDF | 56.2 | — | 54.1 | — |
| HFP | 20.5 | — | 21.4 | — |
| TFE | 23.4 | 50 | 24.5 | 50 |
| bis-olefin | 0.146 | — | — | — |
| ET | — | 50 | — | 50 |
| Soft/hard weight ratio | 80:20 | | 80:20 | |
| $T_g$ (°C.) | −14.5 | | −13 | |
| $T_m$ (°C.) | 267.0 | | 265 | |
| $\Delta H_m$ (cal/g) (ASTM D3418-82 - DSC) | 32 | | 33 | |
| Mechanical properties after press at 180° C. for 5 min (ASTM D412-83) | | | | |
| Modulus at 50% (MPa) | — | | — | |
| Modulus at 100% (MPa) | 4.2 | | 2.8 | |
| Modulus at 200% (MPa) | — | | — | |
| Stress at break (MPa) | 15.0 | | 10.5 | |
| Elongation at break (%) | 420 | | 640 | |
| Shore A Hardness (points) | 77 | | 77 | |
| Compression set (ASTM D395 Method B) | | | | |
| at 120° C. for 24 hrs (%) | — | | — | |
| at 100° C. for 24 hrs (%) | 28 | | 57 | |

(*)comparative

We claim:

1. A fluorinated thermoplastic elastomer having a block structure consisting of at least a fluorinated polymer segment of type A, having elastomeric properties, whose monomer structure is selected from the group consisting of (% by moles):

vinylidene fluoride (VDF) 45–85%, hexafluoropropene (HFP) 15–45%, tetrafluoroethylene (TFE) 0–30%;

vinylidene fluoride 50–80%, (per) fluoroalkylvinylether CF$_2$=CFOR$_f$ where R$_f$ is a C$_1$–C$_6$ perfluoroalkyl (PAVE) 5–50%, tetrafluoroethylene 0–20%;

vinylidene fluoride 20–30%, C$_2$–C$_8$ non-fluorinated olefin 10–30%, hexafluoropropene and/or PAVE 18/27%, tetrafluorethylene 10–30%;

tetrafluorethylene 50–80%, PAVE 20–50%;

tetrafluoroethylene 32–60%, C$_2$–C$_8$ non-fluorinated olefin 10–40%, PAVE 20–40%, and at least a fluorinated polymer segment of type B, having plastomeric properties, selected from the group consisting of (compositions expressed as % by moles)

1) polytetrafluoroethylene or modified polytetrafluoroethylene containing from 0.1 to 3% of one or more comonomers selected from HFP, PAVE, VDF, hexafluoroisobutene, chorotrifluoroethylene (CTFE), perfluoroalkylethylenes;

2) TFE thermoplastic polymers containing from 0.5 to 8% of at least a PAVE;

3) TFE thermoplastic polymers containing from 2 to 20% of a perfluoroolefin C$_3$–C$_8$, optionally containing up to 5% of PAVE or (per)fluorooxyalkylvinylether CF$_2$=CFO$_x$, where x is a (per) fluoro oxyalkyl C$_1$–C$_{12}$;

4) copolymers of the TFE or CTFE (40–60%) with ethylene, propylene or isobutylene (40–60%), optionally containing as a third comonomer a (per) fluoroolefin C$_3$–C$_8$ or a PAVE, in an amount of from 0.1 to 10%;

5) polyvinylidenefluoride or modified polyvinylidenefluoride containing from 0.1 to 10% of one or more fluorinated comonomers selected from: hexafluoropropene, tetrafluoroethylene, trifluroethylene, wherein at least one of the segments of type A or B comprises monomeric units deriving from a bis-olefin having general formula:

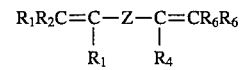

wherein:

R$_1$, R$_2$, R$_3$, R$_4$, R$_5$, R$_6$, equal or different from each other, are H or alkyl C$_1$–C$_5$;

Z is a linear or branched alkylene or cycloalkylene radical C$_1$–C$_{18}$, optionally at least partially fluorinated, or a (per) fluoropolyoxyalkylene radical.

2. The fluorinated thermoplastic elastomer according to claim 1, wherein Z is an at least partially fluorinated alkylene or cycloalkylene C$_1$–C$_{18}$ radical.

3. The fluorinated thermoplastic elastomer according to claim 2, wherein Z is perfluoroalkylene C$_4$–C$_{12}$ radical.

4. The fluorinated thermoplastic elastomer according to claim 1, wherein R$_1$, R$_2$, R$_3$, R$_4$, R$_5$, R$_6$ are hydrogen.

5. The fluorinated thermoplastic elastomer according to claim 1, wherein the amount of units deriving from the bis-olefin in each polymer segment is from 0.01 to 1.0% by mole, calculated with respect to the total amount of the other monomers forming the polymer segment.

6. The fluorinated thermoplastic elastomer according to claim 5, wherein the amount of units deriving from the bis-olefin in each polymer segment is from 0.03 to 0.5% by mole, calculated with respect to the total amount of the other monomers forming the polymer segment.

7. The fluorinated thermoplastic elastomer according to claim 1, wherein the weight ratio between elastomeric segments of type A and plastomeric segments of type B is comprised between 50:50 and 95:5.

8. The fluorinated thermoplastic elastomer according to claim 7, wherein the weight ratio between elastomeric segments of type A and plastomeric segments of type B is comprised between 60:40 and 90:10.

* * * * *